United States Patent [19]

Iwasawa

[11] 4,386,302
[45] May 31, 1983

[54] CONTROL DEVICE FOR A MULTISPEED MOTOR

[75] Inventor: Teruo Iwasawa, Mitaka, Japan

[73] Assignee: Olympus Optical Co., Ltd., Tokyo, Japan

[21] Appl. No.: 203,515

[22] Filed: Nov. 3, 1980

[30] Foreign Application Priority Data

Nov. 12, 1979 [JP] Japan ............... 54-156832[U]

[51] Int. Cl.³ .............................................. H02P 7/06
[52] U.S. Cl. .................................. 318/318; 318/328; 318/618
[58] Field of Search ............... 318/317, 326, 327, 328, 318/616, 617, 618, 318

[56] References Cited

U.S. PATENT DOCUMENTS

| Re. 30,684 | 7/1981 | Bullivant | 318/318 X |
| 3,110,853 | 11/1963 | Jones | 318/328 |
| 3,340,951 | 9/1967 | Vitt | 318/327 |
| 3,843,914 | 10/1974 | Carlson et al. | 318/327 |
| 3,898,545 | 8/1975 | Coppa et al. | 318/327 X |
| 3,952,236 | 4/1976 | Hoover | 318/326 X |
| 4,114,075 | 9/1978 | Minakuchi | 318/327 X |
| 4,218,641 | 8/1980 | Arnold et al. | 318/327 X |

OTHER PUBLICATIONS

IBM Bulletin, vol. 14, No.2, Jul., 1971, pp. 388-389, Coburn et al.-Bidirectional PWM Motor Speed Control.

Primary Examiner—David Smith, Jr.
Assistant Examiner—Richard M. Moose
Attorney, Agent, or Firm—Frishauf, Holtz, Goodman & Woodward

[57] ABSTRACT

A control device for multispeed motor having a first circuit for providing a detection signal whose period corresponds to a rotation speed of the motor, a trigger pulse generator connected to the first circuit for generating a trigger pulse corresponding to the detection signal, and a second circuit connected between the trigger pulse generator and the motor for providing a drive signal in accordance with the trigger pulse. The motor, first circuit, trigger pulse generator and second circuit form a closed negative feedback loop. The trigger pulse generator is characterized by a first trigger pulse generator for generating a first trigger pulse whose period corresponds to the period of the detection signal when the motor rotates with a first speed, a second trigger pulse generator for generating a second trigger pulse whose period corresponds to half the period of the first trigger pulse when the motor rotates with the first speed; and a selector connected to the first and second trigger pulse generators for selecting either said first or second trigger pulse and providing the selected trigger pulse as the trigger pulse.

12 Claims, 5 Drawing Figures

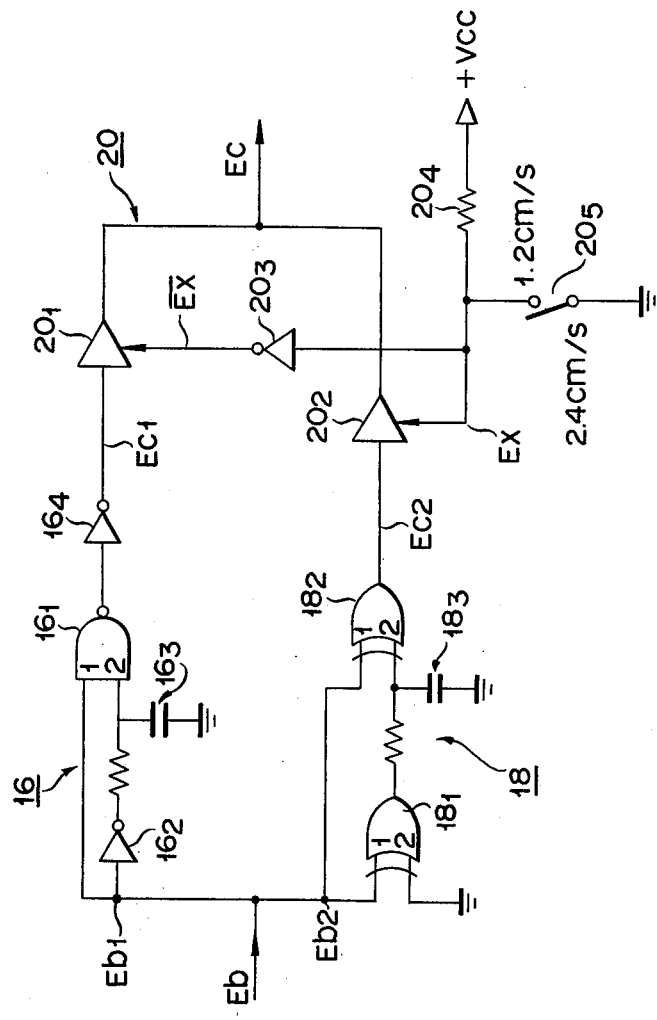
F I G. 5

CONTROL DEVICE FOR A MULTISPEED MOTOR

BACKGROUND OF THE INVENTION

The present invention relates to a control device for a multispeed motor whose rotation speed is electrically controlled.

A typical compact multispeed motor used in a two-speed type microcassette tape recorder is a DC servomotor having a frequency generator (FG). With a motor of this type, the operation of setting the rotation speed to a desired value is performed by adjusting semi-fixed type resistors. Accordingly, for obtaining two different rotation speeds with the conventional FG servomotor or an electric governor motor, two semi-fixed type resistors and two operations of speed adjustment are required. The inclusion of two semi-fixed type resistors makes it difficult to provide a compact motor. This is not, however, only because the space occupied by the semi-fixed type resistors increases, but also because undesirably space must be provided around the semi-fixed type resistors for inserting an adjusting screwdriver or the like into the control circuit for adjusting these semi-fixed type resistors. Further, when two semi-fixed type resistors are included, the speed adjusting process must be performed twice, so that the number of manufacturing steps of the objective product increase. Two separate adjusting procedures also result in more variation in the rotation speed of the motor.

SUMMARY OF THE INVENTION

The present invention has been made in consideration of this and has for its object to provide a control device for an electrically controlled multispeed motor in which two or more adjustments of the rotation speed may be performed simultaneously with a single adjusting part.

In order to accomplish the above object, the present invention provides a control device for an electrically controlled multispeed motor comprising an electrically controlled motor; a first trigger pulse generator for generating a first trigger pulse whose period corresponds to the period of the detection signal when the motor rotates with a first speed; a second trigger pulse generator for generating a second trigger pulse whose period corresponds to half the period of the first trigger pulse when the motor rotates with the first speed; a selector for selecting either the first trigger pulse or the second trigger pulse; and second means for providing a drive signal for driving the motor according to the trigger pulse selected by the selector. The motor, the first means, the first or second trigger generator, and the second means form a negative feedback loop. When the trigger pulse inside the feedback loop is changed by the selector, the rotation speed of the motor is changed.

With the control device of the above construction, speed adjustment is required only once. If the rotation speed of the motor is adjusted with the first speed, the adjustment of the rotation speed of the motor with the second speed is not required. For example, it is assumed that an adjustment is made so that the first speed corresponds to a tape speed of 2.4 cm/s when the first trigger pulse is being selected. In this case, if the number of second trigger pulses generated per revolution of the motor is set to be twice the number of first trigger pulses generated per revolution of the motor, a second speed corresponding to a tape speed of 1.2 cm/s is automatically provided with the action of the negative feedback loop when this second trigger pulse is selected.

The number of trigger pulses to be selected does not change even when the speed is changed (this may be understood from FIGS. 3 and 4). Therefore, the transfer function of the signal path of the control circuitry for the motor becomes constant so that a stable servo loop may be obtained.

BRIEF DESCRIPTION OF THE DRAWINGS

FIG. 5 is a circuit diagram illustrating the main part of FIG. 1 in detail.

DETAILED DESCRIPTION OF THE PREFERRED EMBODIMENTS

Before proceeding with the description of the embodiments of the invention, it will be expressly understood that like reference symbols are used to designate like portions throughout the drawings for simplicity of illustration and that components designated by like reference symbols may easily be exchanged or replaced by another with minor changes by a person skilled in the art. An embodiment of a control device for a multispeed motor according to the invention will be described.

Figure 1:
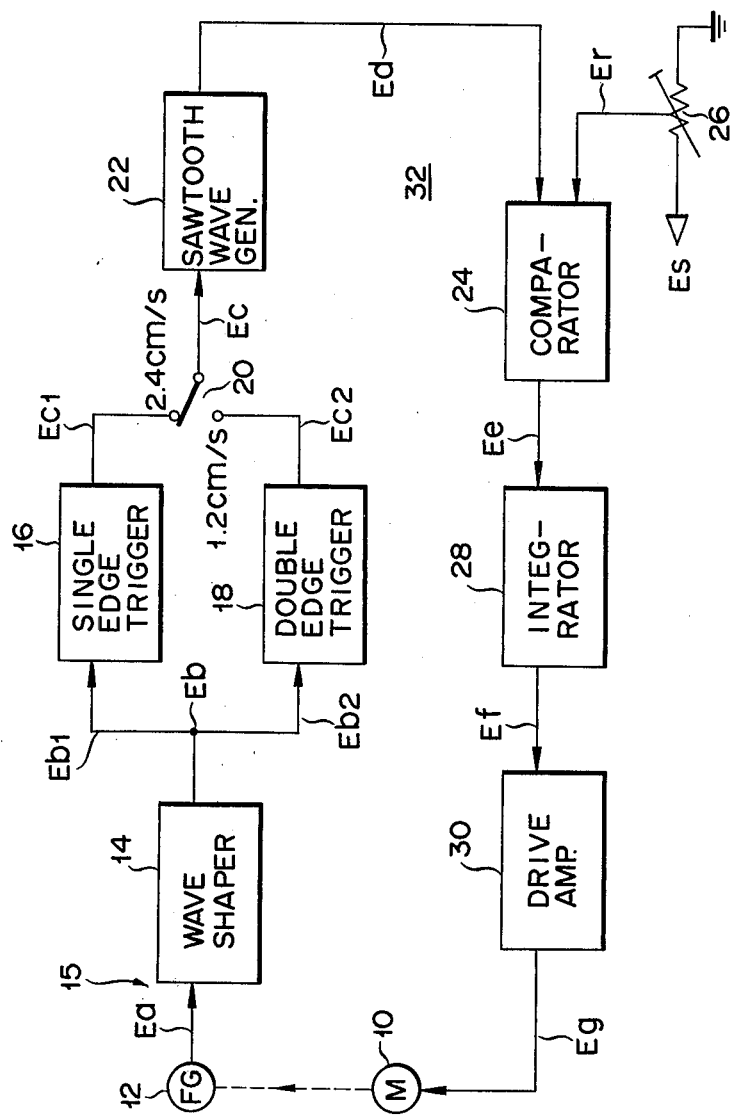
FIG. 1 is a block diagram illustrating a control device in accordance with an embodiment of the present invention.
Figure 2:
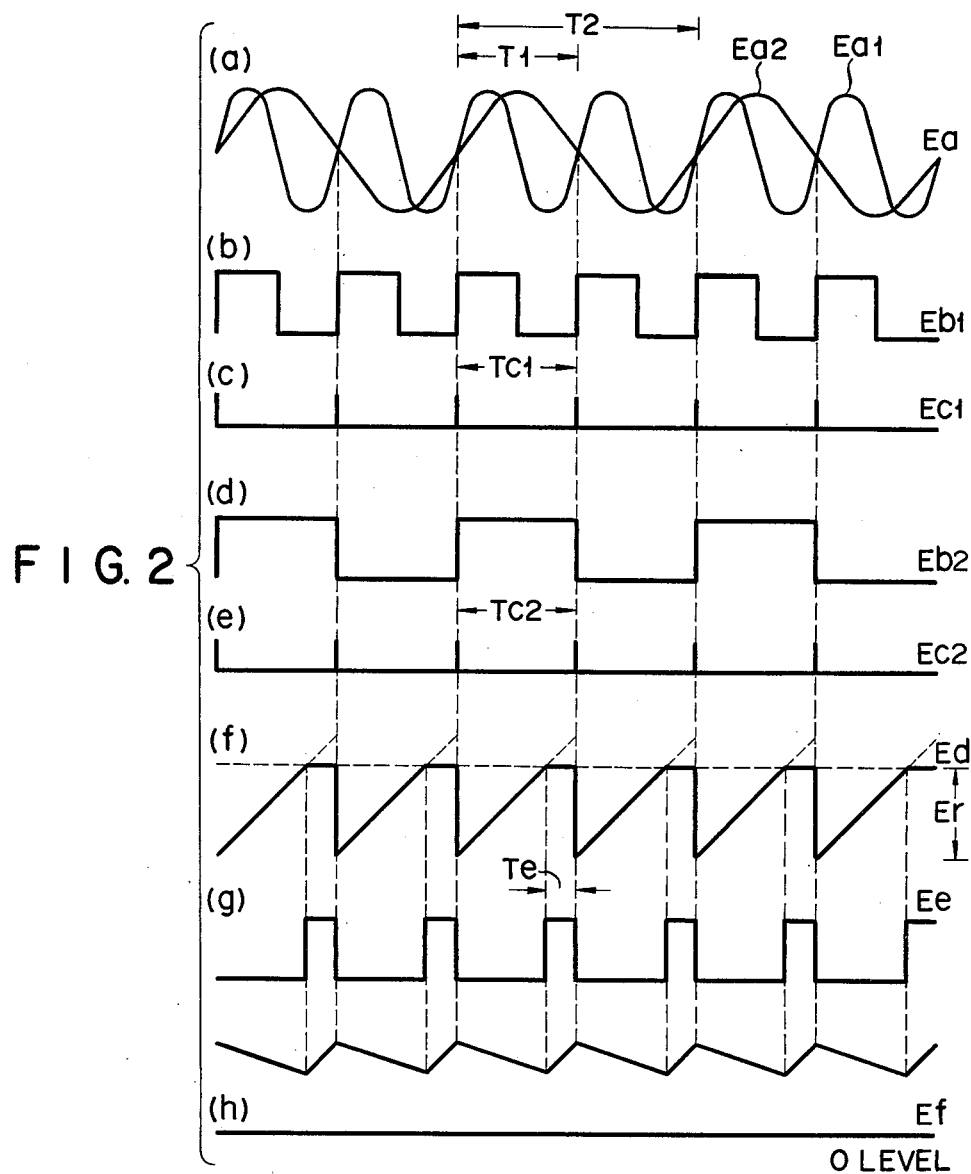
FIG. 2 shows timing charts for explaining the operation of the device shown in FIG. 1.

FIG. 1 shows a control device according to the present invention. A frequency generator (FG) 12 is coupled to an electrically controlled motor 10. The FG 12 may comprise a general generator, a Hall element, a magnetic head or the like. A first signal Ea outputted from the FG 12 has a period which is inversely proportional to the rotation speed of the motor 10. For example, when the motor 10 is rotating at a high speed corresponding to a tape speed of 2.4 cm/s, the period T1 of the first signal Ea1 is short, as shown in FIG. 2(a). On the other hand, when the motor is rotating at a low speed corresponding to a tape speed of 1.2 cm/s, the period T2 of the first signal Ea2 becomes long. The first signal Ea outputted from the FG 12 is converted into a detection signal Eb of rectangular wave, as shown in FIG. 2(b) or 2(d), by a wave-shaper circuit 14 such as a Schmitt circuit or a flip-flop.

The FG 12 and the circuit 14 comprise a first means 15 for providing the detection signal Eb having a period corresponding to the rotation speed of the motor 10.

The detection signal Eb is input to a single edge trigger circuit 16 and a double edge trigger circuit 18. The single edge trigger circuit 16, in response to the rising edge (or the falling edge) of the input pulse alone, generates a first trigger pulse Ec1. When the detection signal Eb1, as shown in FIG. 2(b) for example, is input, the circuit 16 generates the first trigger pulse Ec1 as shown in FIG. 2(c). The double edge trigger circuit 18, in response to both the rising and falling edges of the input pulse, generates a second trigger pulse Ec2. When the detection signal Eb2, as shown in FIG. 2(d) for example, is input, the circuit 18 generates the second trigger pulse Ec2 as shown in FIG. 2(e).

The single edge trigger circuit 16 forms a first trigger pulse generating means for generating a first trigger pulse Ec1 at intervals equal to one period of the detection signal Eb. The double edge trigger circuit 18 forms a second trigger pulse generating means for generating a second trigger pulse Ec2 at intervals different from the period of the detection signal Eb, for example ½ the period of the detection signal Eb.

The first trigger pulse Ec1 and the second trigger pulse Ec2 are input to a selection switch circuit 20. The switch circuit 20 is used for controlling the speed. For example, the first trigger pulse Ec1 is selected for obtaining a tape speed of 2.4 cm/s, and the second trigger pulse Ec2 is selected for obtaining a tape speed of 1.2 cm/s.

The trigger pulse Ec selected by the switch circuit 20 is input to a sawtooth wave generator circuit 22. The circuit 22 generates a sawtooth wave signal Ed of the same period as that of the trigger pulse Ec, as shown in FIG. 2(f). The signal Ed is input to a comparator 24. A reference voltage Er for comparison is supplied to the comparator 24. The reference voltage Er is obtained by voltage-dividing a stabilized voltage Es by a semi-fixed type resistor 26. Thus, the voltage Er may be adjusted by the semi-fixed type resistor 26. The comparator 24 outputs a second signal Ee as shown in FIG. 2(g). The second signal Ee is generated when the voltage level of the signal Ed exceeds the voltage Er.

The second signal Ee is input to an integrator circuit 28. The circuit 28 integrates the signal Ee and then outputs a third signal Ef with a triangular wave form as shown in FIG. 2(h). The signal Ef is power amplified by a driver amplifier 30. The signal Ef which is power amplified by the amplifier 30 becomes a drive signal Eg and is supplied to the motor 10.

The components 22 to 30 form a second means 32 for providing the drive signal Eg to the motor 10 according to the trigger pulse Ec selected by the selection switch circuit 20.

The circuit configuration as shown in FIG. 1 operates in the following manner. The rotation speed of the motor 10 is substantially proportional to the voltage level of the signal Eg. It is assumed that the motor 10 is assembled in a tape transport (tape recorder mechanism) which is not shown in the drawings and is rotating at a first rotation speed w1 corresponding to a tape speed of 2.4 cm/s. Then, the FG 12 outputs the first signal Ea1 having the period T1 corresponding to the speed w1. The signal Ea1 is shaped by the wave-shaper circuit 14 and is input, as a detection signal Eb1, to the single edge trigger circuit 16. The trigger circuit 16 outputs the first trigger pulse Ec1 of a pulse interval TC1. The trigger pulse Ec1 is input to the sawtooth wave generator circuit 22 through the selection switch circuit 20. The circuit 22 outputs the sawtooth wave signal Ed of the same period as that of the trigger pulse Ec1. The signal Ed is compared by the comparator 24 with the reference voltage Er. The comparator 24 outputs the second signal Ee, which becomes high level when $Ed \geq Er$.

The second signal Ee is integrated by the integrator circuit 28 and is amplified by the drive amplifier 30 to be returned to the motor 10 as the drive signal Eg. The rotation speed w1 of the motor 10 is proportional to the voltage level of the signal Eg, and the voltage level of Eg is proportional to a pulse width Te of the signal Ee during the high level period. The pulse width Te is inversely proportional to the reference voltage Er and is proportional to the pulse interval TC1 of the trigger pulse Ec1. The pulse interval TC1 is equal to the period T1 of the first signal Ea1, and the period T1 is inversely proportional to the rotation speed w1. Accordingly, when the speed w1 increases, the pulse interval TC1 narrows and the pulse width Te also narrows. Then the voltage level of the signal Eg is reduced so that the increase in the speed w1 is cancelled.

As may be apparent from the above description, the components 10→12→14→16 (or 18)→20→22→24→28→30 form a negative feedback loop, that is, a loop in which a control target is provided by the reference voltage Er. Thus, the rotation speed w1 of the motor 10 can be adjusted by the semi-fixed type resistor 26. After this adjustment, the speed w1 is kept constant.

It is to be noted that the rotational speed w1 of the motor 10 is dependent on the pulse interval TC1 of the trigger pulse Ec1, so that the servo operation is performed for keeping the interval TC1 constant when the voltage Er is constant. Thus, if measures are taken so that the pulse interval of the trigger pulse Ec does not change even when the rotation speed of the motor 10 is changed, the rotation speed of the motor 10 can be changed without changing the condition of the servo system, i.e. without changing the reference voltage Er. In the embodiment shown in FIG. 1, the relation between the pulse interval of the trigger pulse Ec and the rotation speed of the motor 10 is controlled by the selection switch circuit 20 for selecting the two trigger circuits 16 and 18.

The case immediately after the selection switch circuit 20 is switched from the single edge trigger circuit 16 side to the double edge trigger circuit 18 side will now be discussed. In this case, the pulse interval TC2 of the second trigger pulse Ec2 is one-half the pulse interval TC1 of the first trigger pulse Ec1. Then, the voltage of the drive signal Eg is reduced unit TC2=TC1 by the above-mentioned operation of the servo loop. When the rotation speed w2 is attained so that TC2=TC1, the period T2 of the first signal Ea2 outputted from the FG 12 becomes twice the period T1 obtained with the rotation speed w1. Consequently, when the second trigger pulse Ec2 is selected by the selection switch circuit 20, a tape speed of 1.2 cm/s may be correctly obtained without readjusting the semi-fixed type resistor 26.

Figure 3:
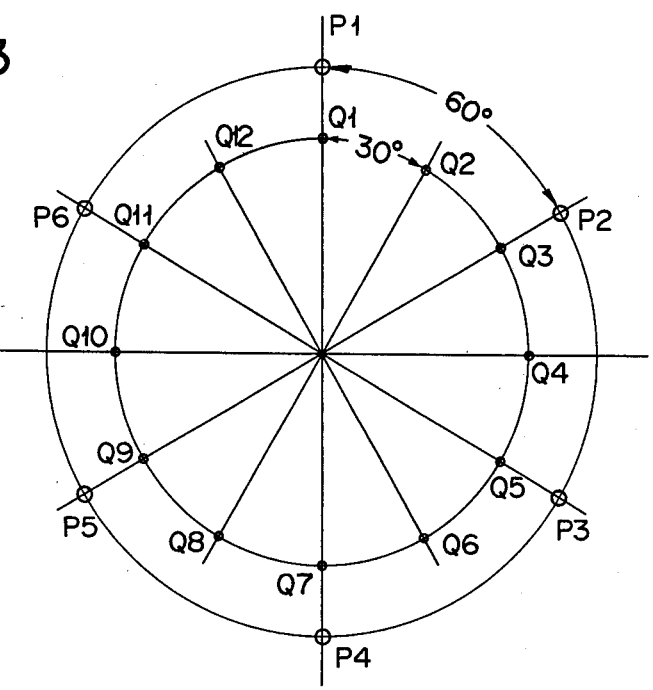
FIGS. 3 and 4 are views for illustrating the relation between the rotation angles of the motor controlled with the construction shown in FIG. 1 and the generating timing of the trigger pulse Ec.

FIG. 3 shows generation points of the trigger pulse Ec when the FG 12 comprises a 6-pole type frequency generator. The FG 12 generates a first signal Ea of 6 periods per revolution of the motor. When the single edge trigger circuit 16 is used, the generation points of the first trigger pulses Ec1 are points P1 to P6 defined by a 60° rotation angle. When the double edge trigger circuit 18 is used, the generating points of the second trigger pulses Ec2 are Q1 to Q12 defined by a 30° rotation angle.

Figure 4:
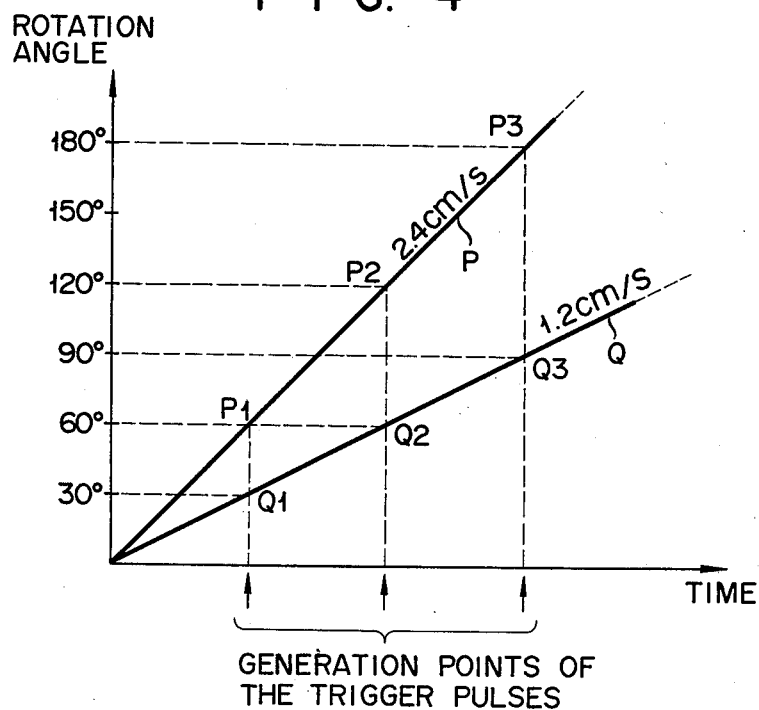

FIG. 4 is a graph in which the trigger pulse generating points shown in FIG. 3 are coverted into time axis. This graph shows that a trigger pulse is generated for every 60° rotational angle for a line P corresponding to a tape speed of 2.4 cm/s, and a trigger pulse is generated for every 30° rotational angle for a line Q corresponding to a tape speed of 1.2 cm/s. It will be understood from FIG. 4 that the number of the trigger pulses Ec per unit time is the same for both the tape speeds 2.4 cm/s and 1.2 cm/s.

FIG. 5 shows an example of a circuit arrangement of the trigger circuits 16 and 18, and the selection switch circuit 20. The detection signal Eb outputted from the wave-shaper circuit 14 is input to an inverter $16_2$ and the first input of a NAND gate $16_1$. The output of the inverter $16_2$ is connected to the second input of the NAND gate $16_1$ through a CR delay circuit $16_3$. The first trigger pulse Ec1 obtained from the NAND gate $16_1$ is input to a tristate buffer $20_1$ through an inverter $16_4$. The detection signal Eb is also input to the respective inputs of EXOR gates $18_1$ and $18_2$. The output of the EXOR gate $18_1$ is connected to the second input of the EXOR gate $18_2$ through a CR delay circuit $18_3$. The second trigger pulse Ec2 outputted from the EXOR gate $18_2$ is input to a tristate buffer $20_2$.

The trigger pulse Ec corresponding to either the first trigger pulse Ec1 or the second trigger pulse Ec2 is outputted from the outputs of the buffers $20_1$ and $20_2$. A control signal Ex is input to the control input of the buffer $20_2$. A control signal Ex of the opposite phase to that of the signal Ex is input to the control input of the buffer $20_1$. The signal Ex is obtained by level-inverting the signal Ex by an inverter $20_3$. The signal Ex is obtained by voltage division or on-off operation of a positive voltage +Vcc corresponding to the logic level "1", using a resistor $20_4$ and a speed selection switch $20_5$. When the switch $20_5$ is off, Ex=1 and Ex=0. Then, the buffer $20_1$ is rendered conductive and the buffer $20_2$ is rendered nonconductive so that Ec=Ec1. Then, the tape speed becomes 2.4 cm/s. On the other hand, when the switch $20_5$ is on, Ex=0, Ex=1, and Ex=Ec2. The tape speed becomes 1.2 cm/s in this case.

The particular embodiments as described above and shown in the drawings do not in any way limit the present invention. Various modifications and changes may thus be made without departing from the spirit and scope of the appended claims. For example, when the motor 10 is an electrical governor type, the electromotive force of the motor 10 may be bridge-detected to be A/D converted for obtaining the detection signal Eb. Further, instead of accomplishing the speed selection by switching with the single edge trigger circuit 16 and the double edge trigger circuit 18, it may be performed with a frequency divider or a double multiplier, and a differentiation circuit. Instead of the trigger circuits 16 and 18, a programmable counter and a differentiation circuit may be combined, and the preset data of this programmable counter may be designated by a speed selection switch. In this case, any multispeed switching, not necessarily double, is possible. When a plurality of frequency dividers and double multipliers are used, a multispeed motor of double rate and over three speeds may be obtained. In this case, the adjustment of the rotation speed of the motor 10 is performed only once with the semi-fixed type resistor 26.

What is claimed is:

1. A control device for a multispeed motor comprising:
    detection signal generating means for providing a detection signal whose period corresponds to a rotation speed of the motor;
    first trigger pulse generator means connected to said detection signal generating means, for generating a first trigger pulse whose period corresponds to the period of said detection signal at the time when said motor rotates with a first speed;
    a second trigger pulse generator means connected to said detection signal generating means, for generating a second trigger pulse whose period corresponds to half the period of said first trigger pulse at the time when said motor rotates with said first speed, said first and second trigger pulse generator means being coupled in parallel configuration to said detection signal generating means;
    selector means connected to said trigger pulse generator means and to said second trigger pulse generator means, for selecting either of said first and second trigger pulses and providing a selected trigger pulse; and
    drive signal generating means connected to said selector means and to said motor, for providing a drive signal to said motor in accordance with said selected trigger pulse;
    said second trigger pulse generator means including a first EXOR gate having a first input which is coupled to said detection signal generating means so as to be supplied with said detection signal and having a second input connected to ground potential; a second EXOR gate having first and second inputs, said first input of said second EXOR gate being coupled to said detection signal generating means so as to be supplied with said detection signal, and said second EXOR gate further having an output which provides said second trigger pulse; and a first signal delay circuit connected between an output of said first EXOR gate and said second input of said second EXOR gate;
    said motor, said detection signal generating means, said first or second trigger pulse generator means, and said drive signal generating means forming a closed negative feedback loop;
    whereby when said selector means selects said first trigger pulse said motor rotates with said first speed based on the negative feedback operation of said closed negative feedback loop, and when said selector means selects said second trigger pulse, said motor rotates with a second speed based on the negative feedback operation of said closed negative feedback loop so that the period of said second trigger pulse is substantially equal to the period of said first trigger pulse.

2. A control device of claim 1, wherein said first trigger pulse generator means includes:
    an AND gate having first and second inputs, said first input of said AND gate being coupled to said detection signal generating means so as to be supplied with said detection signal, and said AND gate further having an output which provides said first trigger pulse; and
    a second signal delay circuit for level-inverting and delaying said detection signal;
    an output signal of said second signal delay circuit being applied to said second input of said AND gate.

3. A control device of claim 1, wherein said selector means comprises:
    a first tristate buffer having an output, and an input which is coupled to said first trigger pulse generator means so as to be supplied with said first trigger pulse;
    a second tristate buffer having an input which is coupled to said second trigger pulse generator means so as to be supplied with said second trigger pulse and having an output which is connected to said output of said first tristate buffer; and
    control signal providing means for providing a first control signal to said first tristate buffer and a second control signal whose logic level is opposite to the logic level of said first control signal, wherein the conduction states of said first and second tristate buffers are determined by the logic levels of said first and second control signals.

4. A control device of claim 2, wherein said selector means comprises:
a first tristate buffer having an output, and an input which is coupled to said first trigger pulse generator means so as to be supplied with said first trigger pulse;
a second tristate buffer having an input which is coupled to said second trigger pulse generator means so as to be supplied with said second trigger pulse and having an output which is connected to said output of said first tristate buffer; and
control signal providing means for providing a first control signal to said first tristate buffer and a second control signal whose logic level is opposite to the logic level of said first control signal, wherein the conduction states of said first and second tristate buffers are determined by the logic levels of said first and second control signals.

5. In a control device for a multispeed motor comprising:
detection signal generating means for providing a detection signal whose period corresponds to a rotation speed of the motor; trigger pulse generator means for generating a trigger pulse corresponding to said detection signal; and drive signal generating means for providing a drive signal to said motor in accordance with said trigger pulse; wherein said motor, said detection signal generating means, said trigger pulse generator means and said drive signal generating means form a closed negative feedback loop,
the improvement wherein:
said trigger pulse generator means includes:
a single edge trigger circuit for logically composing from said detection signal a first trigger pulse whose period corresponds to the time interval between adjacent rising edges of said detection signal at the time when said motor rotates with a first speed;
a double edge trigger circuit for logically composing from said detection signal a second trigger pulse whose period corresponds to the time interval between the adjacent rising and falling edges of said detection signal at the time when said motor rotates with said first speed; and
a selector means coupled to said single edge and double edge trigger circuits, for selecting either of said first and second trigger pulses and for providing the selected trigger pulse as said trigger pulse;
wherein, when said selector means selects said first trigger pulse said motor rotates with said first speed based on the negative feedback operation of said closed negative feedback loop, and when said selector means selects said second trigger pulse said motor rotates with a second speed based on the negative feedback operation of said closed or negative feedback loop so that the period of said second trigger pulse is substantially equal to the period of said first trigger pulse.

6. The control device of claim 5, wherein said double edge trigger circuit includes: a first EXOR gate having a first input which is supplied with said detection signal and a second input which is grounded; a second EXOR gate having a first input which is supplied with said detection signal and an output which provides said second trigger pulse; and a first signal delay circuit connected between an output of said first EXOR gate and a second input of said second EXOR gate.

7. The control device of claim 5 or 6, wherein said single edge trigger circuit includes an AND gate having a first input which is supplied with said detection signal and an output which provides said first trigger pulse; and a second signal delay circuit for level-inverting and delaying said detection signal; an output signal of said second signal delay circuit being applied to a second input of said AND gate.

8. The control device of claim 7, wherein said selector means comprises a first tristate buffer having an input which is applied with said first trigger pulse; a second tristate buffer having an input which is applied with said second trigger pulse and an output which is connected to an output of said first tristate buffer; and a control signal providing circuit for providing a first control signal to said first tristate buffer and a second control signal whose logic level is opposite to the logic level of said first control signal, the conduction states of said first and second tristate buffers being determined by the logic levels of said first and second control signals provided by said control signal providing circuit.

9. The control device of claim 5 or 6, wherein said selector means comprises a first tristate buffer having an input which is applied with said first trigger pulse; a second tristate buffer having an input which is applied with said second trigger pulse and an output which is connected to an output of said first tristate buffer; and a control signal providing circuit for providing a first control signal to said first tristate buffer and a second control signal whose logic level is opposite to the logic level of said first control signal, the conduction states of said first and second tristate buffers being determined by the logic levels of said first and second control signals provided by said control signal providing circuit.

10. A control device for a multispeed motor comprising:
detection signal generating means for providing a detection signal whose period corresponds to a rotation speed of the motor;
first trigger pulse generator means connected to said detection signal generating means, for generating a first trigger pulse whose period corresponds to the period of said detection signal at the time when said motor rotates with a first speed;
a second trigger pulse generator means connected to said detection signal generating means, for generating a second trigger pulse whose period corresponds to half the period of said first trigger pulse at the time when said motor rotates with said first speed, said first and second trigger pulse generator means being coupled in parallel configuration to said detection signal generating means;
selector means connected to said first trigger pulse generator means and to said second trigger pulse generator means, for selecting either of said first and second trigger pulses and providing a selected trigger pulse; and
drive signal generating means connected to said selector means and to said motor, for providing a drive signal to said motor in accordance with said selected trigger pulse;
said first trigger pulse generator means including an AND gate having first and second inputs, said first input of said AND gate being coupled to said detection signal generating means so as to be supplied with said detection signal, and said AND gate further having an output which provides said first trigger pulse; and a second signal delay circuit for level-inverting and delaying said detection signal; an output signal of said second signal delay circuit being applied to said second input of said AND gate;

said motor, said detection signal generating means, said first or second trigger pulse generator means, and said drive signal generating means forming a closed negative feedback loop;

whereby when said selector means selects said first trigger pulse said motor rotates with said first speed based on the negative feedback operation of said closed negative feedback loop, and when said selector means selects said second trigger pulse, said motor rotates with a second speed based on the negative feedback operation of said closed negative feedback loop so that the period of said second trigger pulse is substantially equal to the period of said first trigger pulse.

11. A control device of claim 10, wherein said selector means comprises:
   a first tristate buffer having an output, and an input which is coupled to said first trigger pulse generator means so as to be supplied with said first trigger pulse;
   a second tristate buffer having an input which is coupled to said second trigger pulse generator means so as to be supplied with said second trigger pulse and having an output which is connected to said output of said first tristate buffer; and
   control signal providing means for providing a first control signal to said first tristate buffer and a second control signal whose logic level is opposite to the logic level of said first control signal, wherein the conduction states of said first and second tristate buffers are determined by the logic levels of said first and second control signals.

12. A control device for a multispeed motor comprising:
   detection signal generating means for providing a detection signal whose period corresponds to a rotation speed of the motor;
   first trigger pulse generator means connected to said detection signal generating means, for generating a first trigger pulse whose period corresponds to the period of said detection signal at the time when said motor rotates with a first speed;
   a second trigger pulse generator means connected to said detection signal generating means, for generating a second trigger pulse whose period corresponds to half the period of said first trigger pulse at the time when said motor rotates with said first speed, said first and second trigger pulse generator means being coupled in parallel configuration to said detection signal generating means;
   selector means connected to said first trigger pulse generator means and to said second trigger pulse generator means, for selecting either of said first and second trigger pulses and providing a selected trigger pulse; and
   drive signal generating means connected to said selector means and to said motor, for providing a drive signal to said motor in accordance with said selected trigger pulse;
   said selector means comprising a first tristate buffer having an output, and an input which is coupled to said first trigger pulse generator means so as to be supplied with said first trigger pulse; a second tristate buffer having an input which is coupled to said second trigger pulse generator means so as to be supplied with said second trigger pulse having an output which is connected to said output of said first tristate buffer; and control signal providing means for providing a first control signal to said first tristate buffer and a second control signal whose logic level is opposite to the logic level of said first control signal, wherein the conduction states of said first and second tristate buffers are determined by the logic levels of said first and second control signals;
   said motor, said detection signal generating means, said first or second trigger pulse generator means, and said drive signal generating means forming a closed negative feedback loop;
   whereby when said selector means selects said first trigger pulse said motor rotates with first speed based on the negative feedback operation of said closed negative feedback loop, and when said selector means selects said second trigger pulse, said motor rotates with a second speed based on the negative feedback operation of said closed negative feedback loop so that the period of said second trigger pulse is substantially equal to the period of said first trigger pulse.

* * * * *